(No Model.)
I. A. RUSSELL.
VEHICLE WHEEL.
No. 476,415. Patented June 7, 1892.
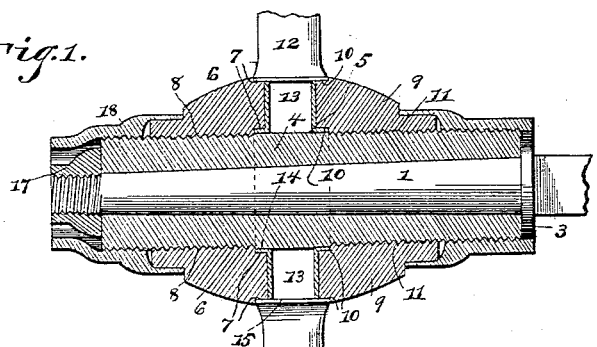
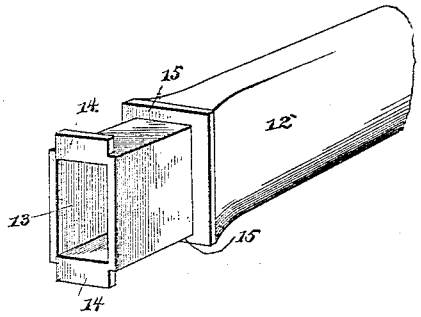
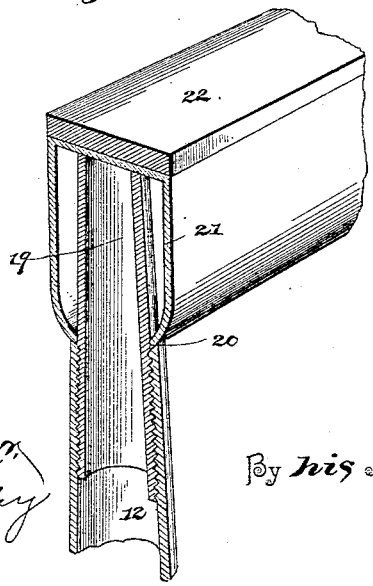
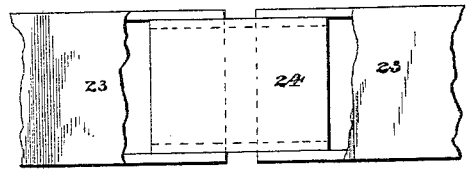
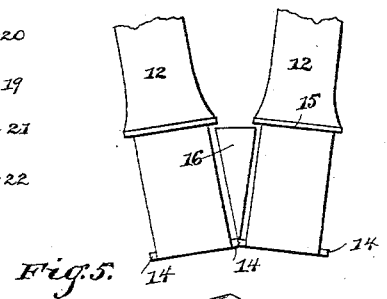
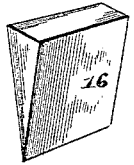
Witnesses
B. S. Ober
H. F. Riley
Inventor
Irvin A. Russell,
By his Attorneys,
C. A. Snow & Co.
THE NORRIS PETERS CO., PHOTO-LITHO., WASHINGTON, D. C.

UNITED STATES PATENT OFFICE.

IRVIN A. RUSSELL, OF MINNEAPOLIS, MINNESOTA, ASSIGNOR OF ONE-HALF TO JOSEPH E. BURGESS, OF SAME PLACE.

VEHICLE-WHEEL.

SPECIFICATION forming part of Letters Patent No. 476,415, dated June 7, 1892.

Application filed August 7, 1891. Serial No. 402,009. (No model.)

*To all whom it may concern:*

Be it known that I, IRVIN A. RUSSELL, a citizen of the United States, residing at Minneapolis, in the county of Hennepin and State of Minnesota, have invented a new and useful Vehicle-Wheel, of which the following is a specification.

This invention relates to improvements in wheels, and to that class thereof constructed of metal.

The objects in view are to produce a wheel of simplicity and of great durability and strength and lightness and to save metal without weakening the wheel.

Various other objects and advantages of the invention will appear in the following description, and the novel features thereof will be particularly pointed out in the claims.

Referring to the drawings, Figure 1 is a vertical longitudinal section of the hub and a portion of the spokes of a wheel constructed in accordance with my invention. Fig. 2 is a detail in perspective of the inner end of a spoke. Fig. 3 is a similar view in section of the outer end of the spoke and the felly. Fig. 4 is a plan of a portion of the felly. Fig. 5 is a detail in perspective of the spoke-spacing wedge-shaped key. Fig. 6 is a detail view of the inner ends of two spokes, showing how the wedge-shaped keys are used.

Like numerals of reference indicate like parts in all the figures of the drawings.

In the drawings, 1 designates the bearing portion of an ordinary axle, in conjunction with which I have illustrated my wheel, which axle at the rear end of its bearing has the usual collar or boss 3 and at its front outer extremity is threaded to receive the usual nut.

4 designates a cylindrical steel sleeve of suitable thickness to constitute the hub of the wheel and having a uniform external diameter throughout its length. The hub is internally and somewhat conically bored to fit the bearing 1 of the axle, as shown, and its exterior is screw-threaded from end to end, with the exception of a central annular space 5.

6 designates a collar, the general external appearance of which is convex, in imitation of the ordinary hub, and at its outer end is polygonal for the purpose of receiving a wrench. The inner face of the collar is provided with a pair of L-shaped annular grooves 7, formed at the corners, and the collar is provided with an internally-threaded bore 8, adapted to receive the front threaded half or portion of the sleeve 4 to which the collar is applied.

9 designates a rear collar, which is the counterpart of the collar 6, it being provided with the L-shaped recesses 10 at the opposite corners of its inner face and at its rear end polygonal for the reception of a wrench. The collar 9 also has the central perforated bore 11 and is threaded, whereby it is adapted to be mounted upon the rear half or portion of the sleeve. The spoke 12 is hollow or tubular and at its inner end is reduced to form a rectangular tenon 13, having at its inner end, at opposite sides, right-angularly-disposed shoulders 14. The formation of the tenon, for which purpose the spoke is reduced, forms opposite shoulders 15 at the butt of the spoke opposite the shoulders 14, but at the opposite end of the tenon. These shoulders 14 and 15 are arranged the same distance apart as are the recesses 7 and 10 of the collars 6 and 9.

In assembling the spokes and collars one of the latter is first placed in position, the spokes assembled around the sleeve, and wedge-shaped steel keys 16 inserted between the diverging tenons of each pair of spokes, after which the companion collar is rotated up into position. It will be seen that the steel keys 16 space the spokes apart and give them the proper inclinations, while the collars 6 and 9 securely clamp the opposite sides of the spokes. A nut 17 is threaded on the outer end of the spindle and serves to retain the sleeve on the latter.

18 designates a pair of cylindrical bands, provided at their centers with polygonal faces for the reception of a wrench. The bands are internally threaded for a portion of their length and are adapted to take over the front and rear ends of the sleeves 4. The inner ends of the bands are somewhat reduced, or may not be so, if desired, and at their inner ends are bulged or flared, so as to take over the adjacent ends of the collars 6 and 9.

The spoke 12 has its outer end internally threaded and has mounted therein an externally-threaded tenon 19, which passes through an opening 20 of the hollow rim 21, the end of the spoke resting on the inner periphery of the rim, while the end of the tenon 19 rests against the interior of the base of the rim. The rim has its inner periphery curved or arched to lend strength and rigidity and is provided with a suitable tire 22. The fellies 23 of the rim are connected by a connecting-dowel 24, of metal, and the remaining space within the rim is preferably filled with plaster-of-paris or other suitable substance, as are also the hollow spokes.

A wheel constructed in accordance with the foregoing description will be found desirable for many reasons. First, it is light and may be cheaply and readily manufactured and its parts assembled, and, finally, it possesses great durability and strength, as well as rigidity.

Having described my invention, what I claim is—

1. In a wheel of the class described, the combination, with the cylindrical metal sleeve externally threaded at opposite sides of its center and the series of spokes terminating at their inner ends in tenons provided at their upper and lower ends with shoulders, of the opposite clamping-collars internally threaded and mounted upon the sleeve at opposite sides of the spokes and provided at their two inner corners with an L-shaped annular continuous groove for receiving the flanges or shoulders of the spokes, substantially as specified.

2. In a wheel of the class described, the combination, with the cylindrical threaded and bored sleeve and the series of spokes reduced at their inner ends to form tenons, having opposite end shoulders at their inner ends and at their outer ends provided with surrounding shoulders, of the series of wedge-shaped keys inserted under the surrounding shoulders between the diverging tenons of each pair of spokes and the front and rear clamping-collars internally threaded and at their inner corners provided with annular grooves L-shaped in cross-section and adapted to fit the shoulders of the spokes, substantially as specified.

3. In a wheel of the class described, the combination, with the centrally-bored exteriorly-threaded sleeve having a plain annular space at its center and the series of spokes terminating at their opposite sides and at their inner ends in outwardly-disposed shoulders, of the opposite clamping-collars having L-shaped annular grooves for receiving the shoulders of the spokes and at their outer ends having an external nut-receiving polygonal surface and the bands mounted upon the sleeve outside of the collars and having at their inner ends swells or enlargements taking over the outer ends of the collars, substantially as specified.

4. In a wheel, the combination, with the tubular spoke threaded at its outer end and a tubular tenon threaded therein, of a hollow rim having an inner arched wall perforated to receive and fit the tenon and a filling of plaster-of-paris or other substance, substantially as specified.

In testimony that I claim the foregoing as my own I have hereto affixed my signature in presence of two witnesses.

IRVIN A. RUSSELL.

Witnesses:
WALTER A. EGGLESTON,
M. A. CLARK.